United States Patent
Naggar et al.

(10) Patent No.: US 9,602,853 B2
(45) Date of Patent: Mar. 21, 2017

(54) CROSS-PLATFORM CONTENT MANAGEMENT INTERFACE

(75) Inventors: Michael J. Naggar, Dallas, TX (US); Ashutosh K. Sureka, Coppell, TX (US); Kristopher T. Frazier, Frisco, TX (US); Alison Kay Allen, Dallas, TX (US); Ryan Evans, Frisco, TX (US); Rahim Charania, Euless, TX (US); Shuchi Patel, Frisco, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 275 days.

(21) Appl. No.: 13/493,246

(22) Filed: Jun. 11, 2012

(65) Prior Publication Data

US 2013/0332838 A1   Dec. 12, 2013

(51) Int. Cl.

| | |
|---|---|
| *G06F 3/048* | (2013.01) |
| *H04N 21/258* | (2011.01) |
| *H04N 21/482* | (2011.01) |
| *G06Q 30/06* | (2012.01) |
| *H04N 21/25* | (2011.01) |
| *H04N 21/2668* | (2011.01) |
| *H04N 21/462* | (2011.01) |
| *H04N 21/81* | (2011.01) |
| *H04N 21/858* | (2011.01) |

(52) U.S. Cl.
CPC ....... *H04N 21/25891* (2013.01); *G06Q 30/06* (2013.01); *G06Q 30/0605* (2013.01); *H04N 21/251* (2013.01); *H04N 21/2668* (2013.01); *H04N 21/4622* (2013.01); *H04N 21/4826* (2013.01); *H04N 21/8133* (2013.01); *H04N 21/8586* (2013.01)

(58) Field of Classification Search
CPC ...................................................... G06F 3/048
USPC ............................................................ 715/733
See application file for complete search history.

(56) References Cited

U.S. PATENT DOCUMENTS

| | | | |
|---|---|---|---|
| 8,271,334 B1* | 9/2012 | Funk .................. | G06Q 30/0639 705/14.11 |
| 8,584,165 B1* | 11/2013 | Kane et al. ..................... | 725/44 |
| 2007/0206247 A1* | 9/2007 | Kaplan ......................... | 358/527 |
| 2008/0133376 A1* | 6/2008 | Hill ........................ | G06Q 30/06 705/26.62 |
| 2008/0229225 A1* | 9/2008 | Kaye ................... | G06F 17/3087 715/771 |
| 2010/0146077 A1* | 6/2010 | Davies .............. | G06F 17/30817 709/219 |
| 2010/0313250 A1* | 12/2010 | Chow .............................. | 726/5 |
| 2011/0126104 A1* | 5/2011 | Woods et al. ................. | 715/719 |

(Continued)

*Primary Examiner* — Xuyang Xia

(57) ABSTRACT

A user device includes a user interface providing access to content from multiple content providers, each of the multiple content providers having a separate subscription associated with the user. The user device receives user input indicating interest in an aspect of particular content available from a first content provider of the multiple content providers and provides, to a network device, an indication of the user interest. The user device receives, from the network device, links to additional content available from a different content provider and related to the aspect of the particular content. The user device presents, via the user interface, the links to the additional content in association with the aspect of the particular content.

20 Claims, 14 Drawing Sheets

(56) References Cited

U.S. PATENT DOCUMENTS

| | | | |
|---|---|---|---|
| 2011/0209185 A1* | 8/2011 | Cho et al. | 725/93 |
| 2011/0214147 A1* | 9/2011 | Kashyap et al. | 725/46 |
| 2012/0045189 A1* | 2/2012 | Singh et al. | 386/285 |
| 2012/0054278 A1* | 3/2012 | Taleb et al. | 709/204 |
| 2012/0174039 A1* | 7/2012 | Rhoads et al. | 715/854 |
| 2012/0233640 A1* | 9/2012 | Odryna et al. | 725/45 |
| 2013/0055311 A1* | 2/2013 | Kirby et al. | 725/44 |
| 2013/0268889 A1* | 10/2013 | Barak | G06F 3/048 715/825 |

* cited by examiner

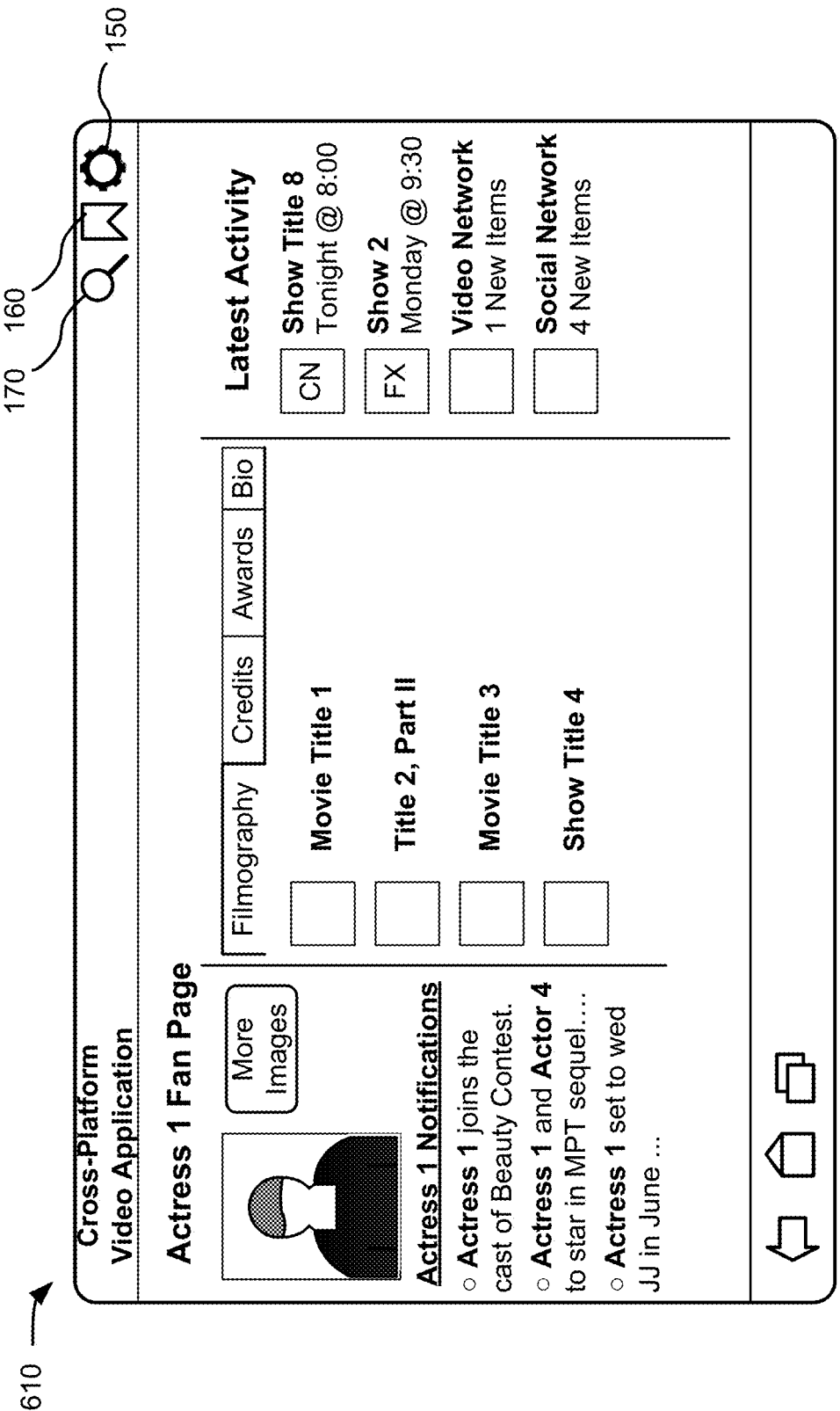

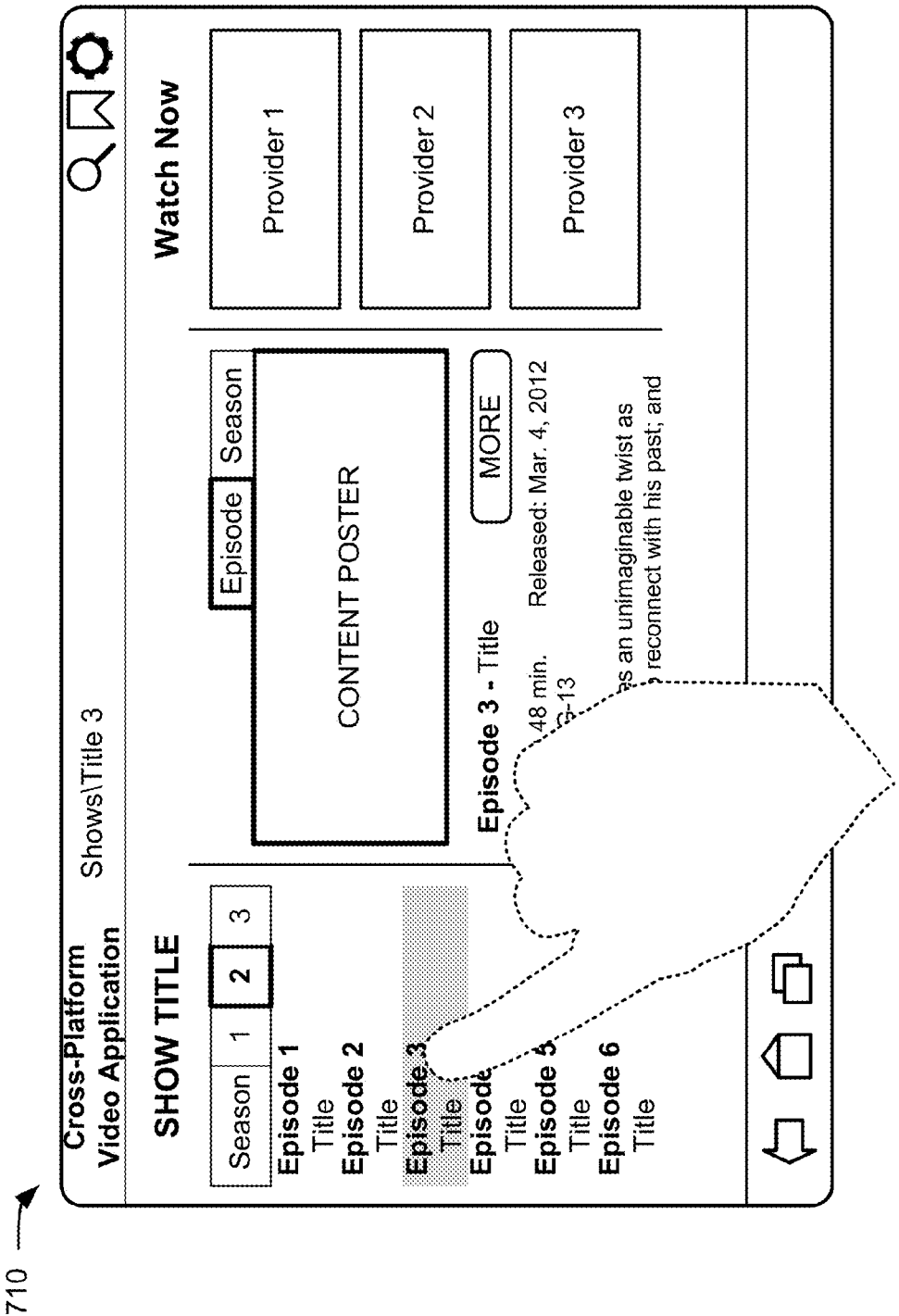

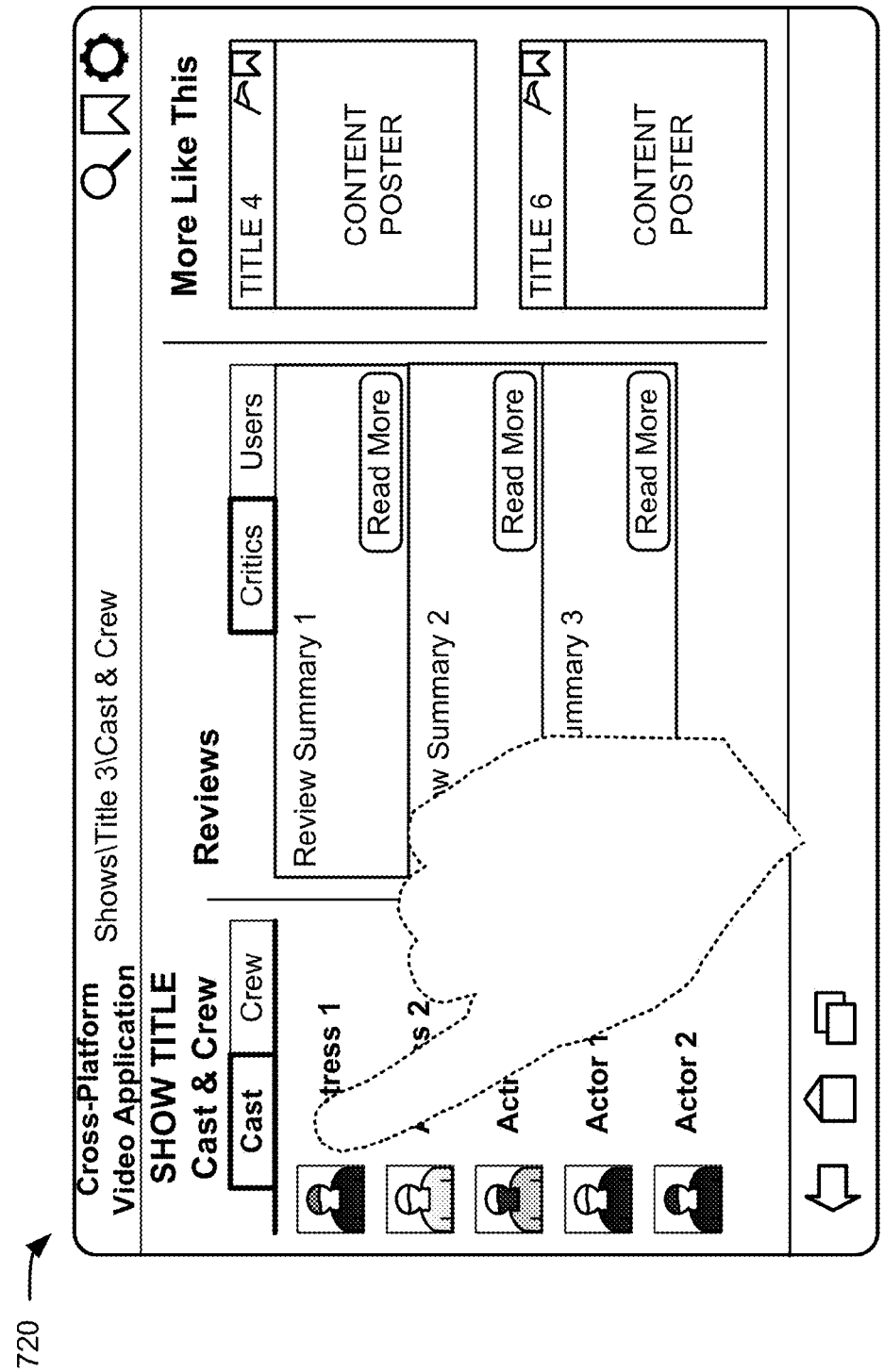

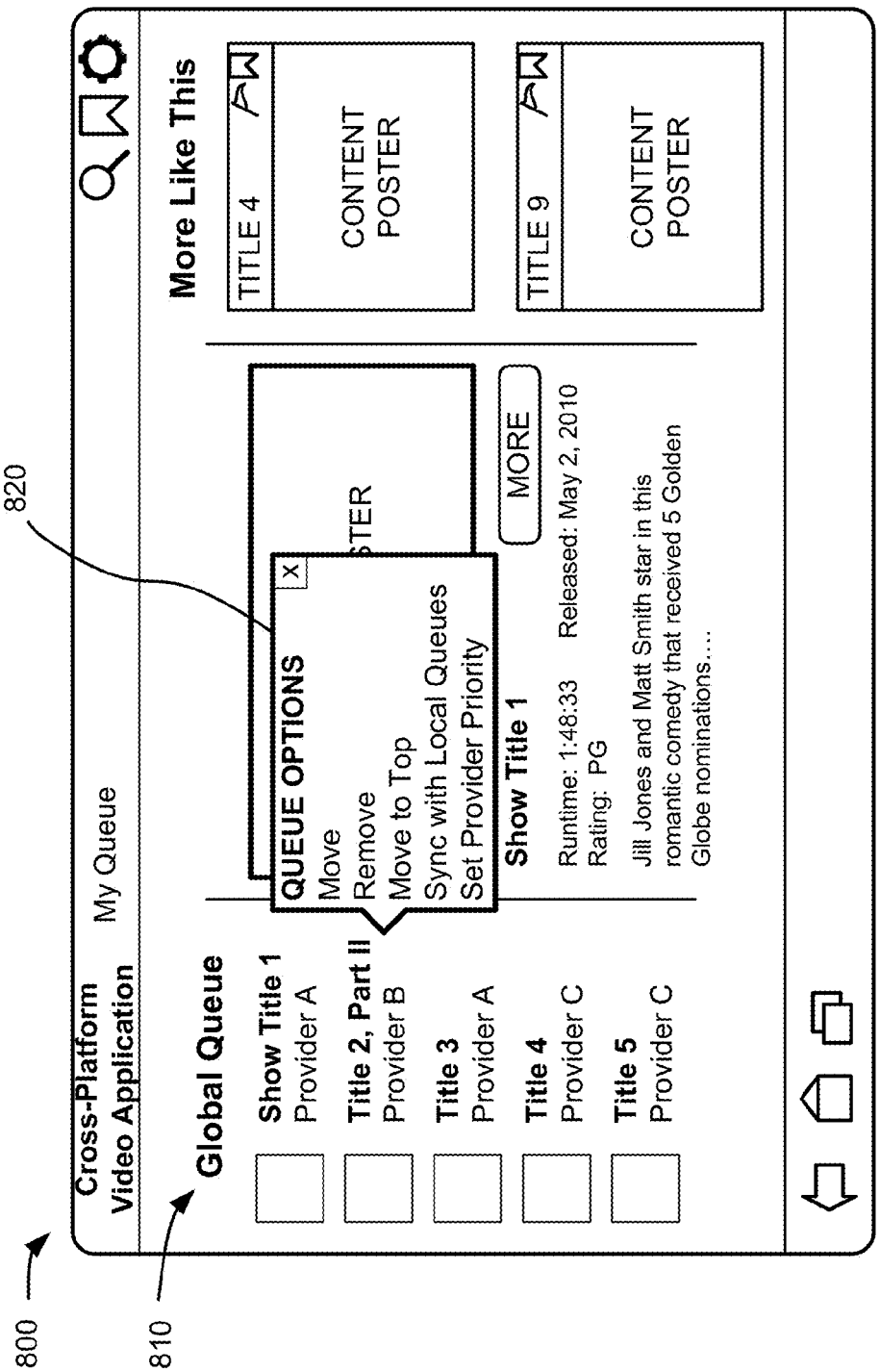

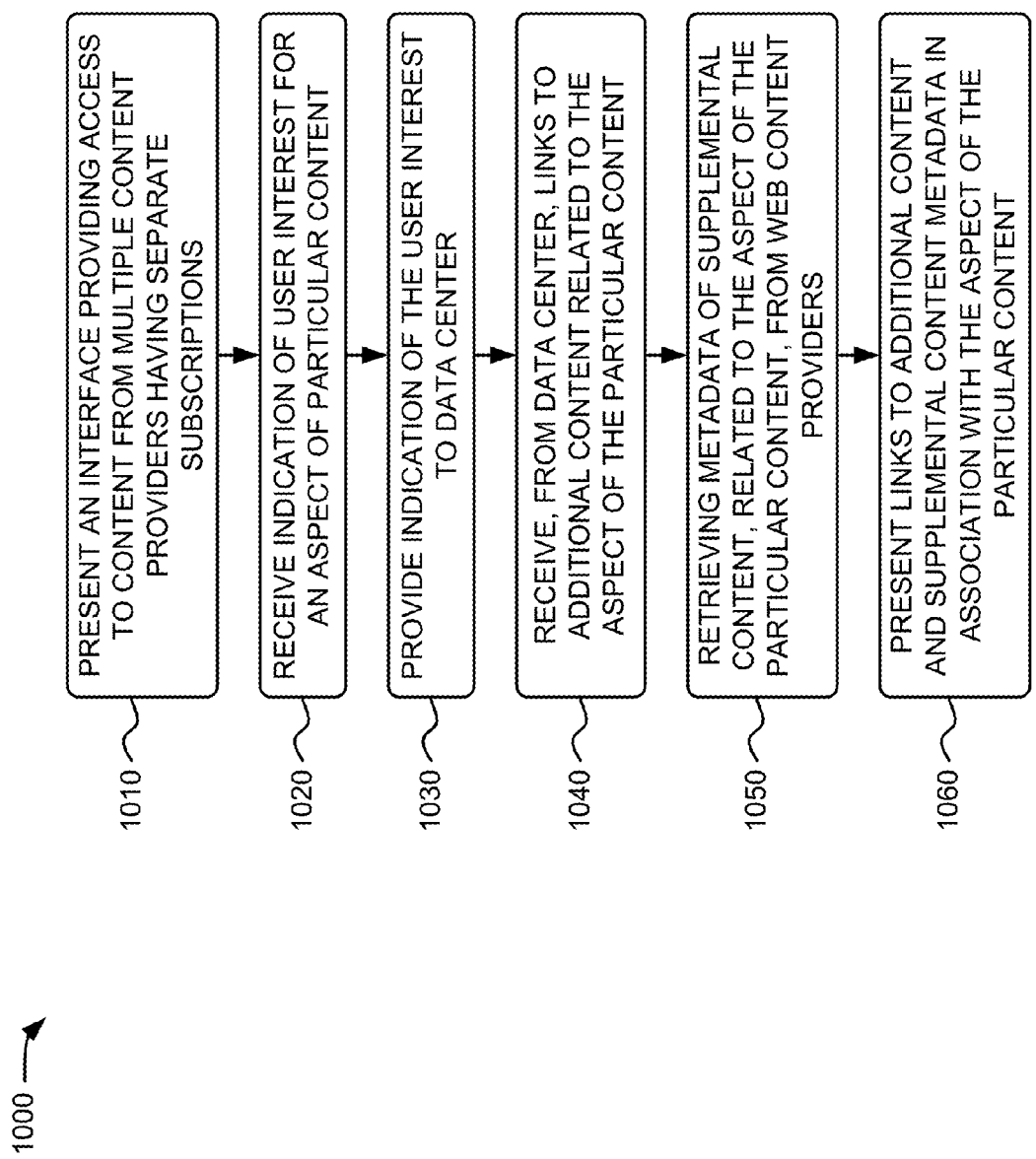

CROSS-PLATFORM CONTENT MANAGEMENT INTERFACE

BACKGROUND

Modern telecommunications systems offer subscribers a number of different communications services, such as television service, data service, and telephone services. Subscribers to such services have access to an ever-growing amount and variety of content, services, and equipment, such as broadcast television content, non-broadcast television content (often referred to as "cable" television content), on demand and pay-per-view content, wireless services, widgets, applications, etc. Subscribers may purchase or subscribe to available content or services by communicating with their providers.

BRIEF DESCRIPTION OF THE DRAWINGS

FIG. 6 is a diagram of an exemplary user interface that may be populated with information from the fan manager of FIG. 5;

FIGS. 7A-7E are diagrams of exemplary user interfaces that implement information from the talent cross-reference module of FIG. 5;

FIG. 8 is a diagram of an exemplary user interface that implements information from the queue manager of FIG. 5;

FIG. 10 is a flow diagram of an exemplary process for providing content management in a cross-platform application.

DETAILED DESCRIPTION OF PREFERRED EMBODIMENTS

The following detailed description refers to the accompanying drawings. The same reference numbers in different drawings may identify the same or similar elements.

As described herein, systems and methods may include a user interface for providing access to content from multiple content providers, each of the multiple content providers having a separate subscription associated with the user. The systems and methods may receive user input indicating interest in an aspect of particular content available from a first content provider of the multiple content providers and may provide, to a network device, an indication of the user interest. The systems and methods may receive, from the network device, links to additional content available from a different content provider and related to the aspect of the particular content. The systems and methods may present, via the user interface, the links to the additional content in association with the aspect of the particular content.

Figure 1:
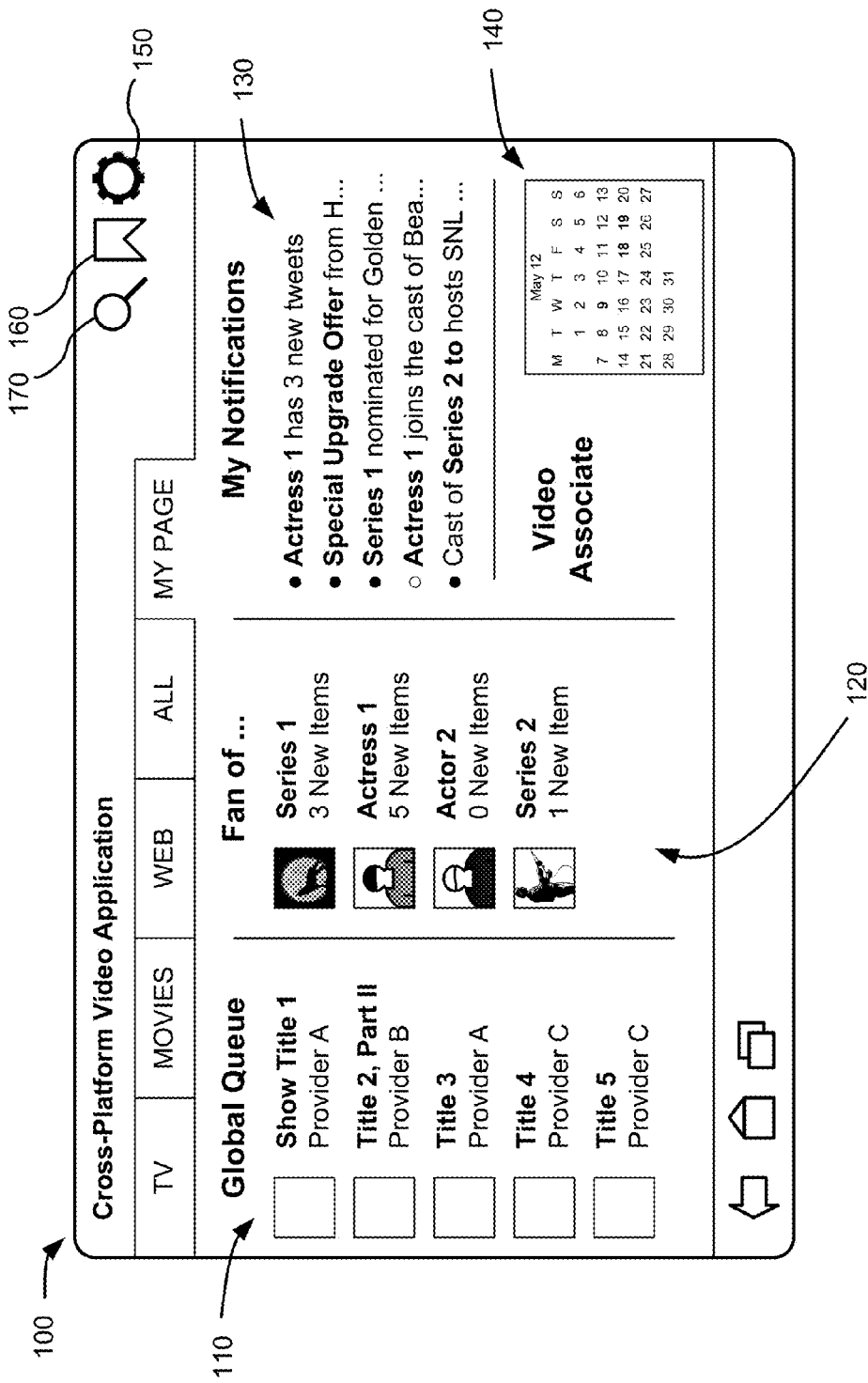
FIG. 1 is a diagram illustrating an exemplary implementation of a user interface, as described herein.

FIG. 1 is a diagram illustrating an exemplary implementation of the concepts described herein. An application, executed on a user device (such as a tablet computer, smartphone, etc.), may provide a platform to conveniently select and present multimedia content from multiple sources. For example, the application may provide a platform for content delivered over an IP network from service providers and respective services (e.g., "cable" television services with cross-platform content delivery), streaming content services, content downloading services, and ad-hoc media services. As shown in FIG. 1, a user interface 100 may provide options to select from different content groupings (e.g., "TV," "Movies," "Web," or "All") across multiple content providers. Some or all of the multiple content providers may require separate accounts/subscriptions to access their respective content. Thus, user interface 100 may provide the convenience of allowing a user to browse through content offerings associated with multiple user accounts/subscriptions in a single user interface.

As shown in FIG. 1, user interface 100 may also provide a personalized interface (e.g., "My Page") with multiple areas to provide content and queue management. These areas may include, for example, a global queue section 110, a fan section 120, a notification section 130, and a video associate section 140. The arrangement and type of areas in the personalized interface of user interface 100 may be user configurable.

As described further below, global queue section 110 may provide an integrated listing of a user's queued items from accounts with different content providers. Fan section 120 may provide a listing of particular content types identified, by a user, for tracking. Notification section 130 may include an interface to present messages pushed to the user's account, such as messages related to fan activity, reminders, announcements, etc. Video associate section 140 may include information and/or a launching point to manage use of content among multiple providers and/or device types.

User interface 100 may include a settings module (which may be accessed via settings icon 150) to enable a user to adjust the presentation and/or configuration of any of global queue section 110, fan section 120, notification section 130, or video associate section 140. User interface 100 may also include a bookmark feature (which may be accessed, for example, via bookmark icon 160) and a search feature (which may be accessed, for example, via search icon 170). The bookmark feature may permit a user to mark particular pages and/or content for future retrieval. The search feature may provide an interactive search interface to search for particular content.

Figure 2:
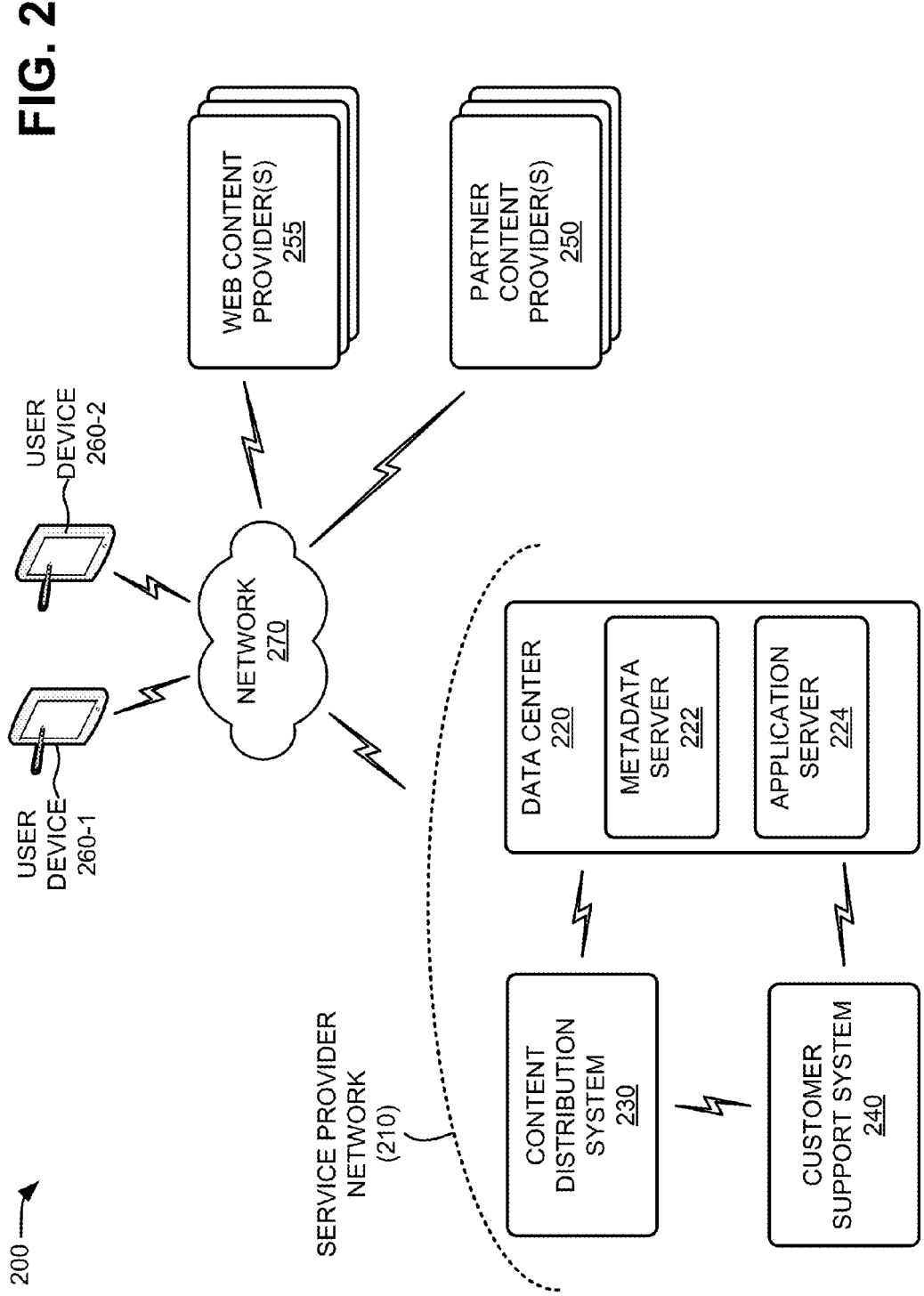
FIG. 2 is a diagram illustrating an exemplary network in which systems and/or methods described herein may be implemented.

FIG. 2 is an exemplary network 200 in which systems and methods described herein may be implemented. As illustrated, network 200 may include service provider network 210 that includes a data center 220, a content distribution system 230, and a customer support system 240; partner content providers 250; web content providers 255; and user devices 260-1 and 260-2 (collectively "user devices 260" and individually "user device 260") interconnected by a network 270.

Service provider network 210 may include network devices to provide a cross-platform application and/or content delivery services to subscribers. Service provider network 210 may also manage data collection for content available from partner content providers 250 and/or web content providers 255. Service provider network 210 may include, for example, one or more private IP networks that use a private IP address space. Service provider network 210 may include a local area network (LAN), an intranet, a private wide area network (WAN), etc. In one implementation, service provider network 210 may implement one or more Virtual Private Networks (VPNs) for providing communication between, for example, any of data center 220, content distribution system 230, and customer support system 240. Service provider network 210 may be protected/separated from other networks, such as network 270, by a firewall. Although shown as a single network in FIG. 2, service provider network 210 may include a number of separate networks.

Data center 220 may manage user authentication, authorization for playing content, selection of content, and/or purchase of content by a user of user devices 260. As shown in FIG. 2, data center 220 may include, for example, a metadata server 222 and an application server 224. In one implementation, data center 220 may be accessed by user devices 260 via network 270.

Metadata server 222 may provide a unified catalog of digital content for users (e.g., of user devices 260) to consume (e.g., view, buy, rent, or subscribe). In one implementation, metadata server 222 may collect and/or present listings of content available to particular user devices 260. For example, metadata server 222 may receive content metadata from content distribution system 230, partner content providers 250, and/or web content providers 255. Content metadata may include, for example, titles, descriptions, images, talent, genres, times, durations, access information, etc. associated with particular content. Metadata server 222 may use the content metadata to provide available content options to cross-platform applications running on user devices 260 (e.g., based on active subscriptions/accounts with content providers 250 and/or web content providers 255). Metadata server 222 may provide the content metadata to user device 260 directly or may communicate with user device 260 via application server 224.

Application server 224 may provide a backend support system for cross-platform applications residing on user devices 260. For example, application server 224 may permit user device 260 to download a cross-platform application that enables a user to find content of interest, cross reference content, order content, and/or play downloaded or streaming content from any of multiple content providers (e.g., content distribution system 230 and partner content providers 250). In some implementations, the downloaded cross-platform application may participate in registration of user device 260 with the multiple content providers.

Once user device 260 is registered with a content provider, the downloaded cross-platform application may enable user device 260 to present, to a user of user device 260, information received from data center 220 in an interactive format, to allow selection of particular digital content. Application server 224 may also provide content metadata to user device 260. In implementations described herein, application server 224 may perform backend services to support features of a cross-platform application operating on user device 260. For example, application server 224 may perform searches based on user input received from user device 260 and provide search results to user device 260. Additionally, or alternatively, application server 224 may provide notifications to user device 260 based on user input. Interactions between application server 224 and user device 260 may be performed, for example, using hypertext transfer protocol (HTTP) or secure HTTP (HTTPS) via network 270. The cross-platform application may coordinate with content distribution system 230 and partner content providers 250 in authorizing user device 260 to access selected content.

Content distribution system 230 may aggregate content and metadata, process content, and distribute content. For example, content distribution system 230 may receive, capture, and encrypt video streams of online live television programs and tag captured content with an identifier, channel identifier, program identifier, airing time, etc. In another example, content distribution system 230 may transcode content into a digital format suitable for consumption on particular user devices 260. In some implementations, content distribution system 230 may include a transcoder (hardware or software) to convert a video file from one format to another (e.g., from one bit rate to another bit rate, from one resolution to another, from one standard to another, from one file size to another, etc.).

In one implementation, content distribution system 230 may include a content delivery system and/or a digital rights management (DRM) server. The content delivery system may deliver digital content from a backend server to user devices 260 via, for example, a content delivery network (CDN). For example, the content delivery system may include a server that provides streaming data (e.g., via a streaming universal resource locator (URL)) to user devices 260 (e.g., via public network 270). The DRM server may issue, validate, and/or enforce DRM licenses to a client, such as a cross-platform application running on one of user devices 260.

Customer support system 240 may provide an interface to receive and respond to customer inquiries (e.g., regarding use of a cross-platform application on user device 260). In one implementation, customer support system 240 may include interfaces for accessing data center 220, content distribution system 230, and/or partner content providers 250 to receive usage reports and/or track usage history to resolve questions, billing disputes, etc.

Partner content provider 250 may aggregate content and metadata, process content, and distribute content. Content may be the same or different content than available from content distribution system 230, web content providers 255, and/or another partner content provider 250. Examples of partner content provider 250 may include, for example, subscriptions services for over-the-top (OTT) video and/or other streaming media services. OTT video content may include, for example, live content streams, pre-recorded video content (e.g., television episodes), and content associated with video portals provided by content providers, such as Hulu Plus, Netflix, YouTube, Amazon Prime, CNN, etc.

Each of partner content providers 250 may coordinate with components of service provider network 210 to provide authentication procedures and metadata for its respective content. In one implementation, partner content provider 250 may provide content metadata to service provider network 210 (e.g., metadata server 222) so that user devices 260 executing a cross-platform application (e.g., provided by service provider network 210) may select content available from partner content provider 250. Based on the metadata, user devices 260 may provide interfaces to cross-reference content across platforms, access selected content, and retrieve the selected content from partner content providers 250.

Web content providers 255 may include a web server to host Internet-based websites, such as content sharing websites (e.g., YouTube, Blip, Veoh, Flikr, etc.), social networking websites (e.g., Twitter, Facebook, Myspace, etc.), blog websites, search engine websites (e.g., Google, Yahoo, etc.), message board websites, etc. In one implementation, web content providers 255 may provide content and/or metadata to user device 260 to allow, for example, a cross-platform application residing on user device 260 to cross-reference web content with other metadata from data center 220. In another implementation, one or more devices of data center 220 may retrieve metadata from web content providers 255.

User device 260 may include a computational or communication device. User device 260 may enable a user to view video content or interact with another user device 260 or a video display device (e.g., a set-top box and/or television). User device 260 may include, for example, a personal communications system (PCS) terminal (e.g., that may combine a cellular radiotelephone with data processing and data communications capabilities), a tablet computer, a smartphone, a personal computer, a laptop computer, a gaming console, an Internet television, or other types of computational or communication devices.

User device 260 includes a cross-platform application that enables user device 260 to communicate with, for example, service provider network 210, partner content providers 250, and/or web content providers 255. The cross-platform application may provide a single interface to select and view content from multiple content sources. For example, the cross-platform application may permit a user of user device 260 to login to an account (e.g., via application server 224) and access catalog information (e.g., from metadata server 222) for content from multiple providers (e.g., content distribution system 230, partner content providers 250, etc.). The cross-platform application may allow a user to select particular content, access another provider account (if necessary), and/or consume live streaming video content (e.g., from content distribution system 230, partner content providers 250, or web content providers 255). The cross-platform application may also provide access to information from web content providers 255 independently from service provider network 210. As described further herein, the cross-platform application may also allow a user to manage content and cross-reference content among the multiple providers.

Network 270 may include a local area network (LAN); an intranet; the Internet; a wide area network (WAN), such as a cellular network, a satellite network, a fiber optic network, a private WAN, or a combination of the Internet and a private WAN; etc., that is used to transport data. Although shown as a single element of network 200 in FIG. 2, network 270 may include a number of separate networks that function to provide services to user devices 260.

In FIG. 2, the particular arrangement and number of components of network 200 are illustrated for simplicity. In practice there may be more service provider networks 210, data centers 220, content distribution systems 230, customer support systems 240, partner content providers 250, web content providers 255, user devices 260, and/or networks 270. Components of system 200 may be connected via wired and/or wireless links.

Figure 3:
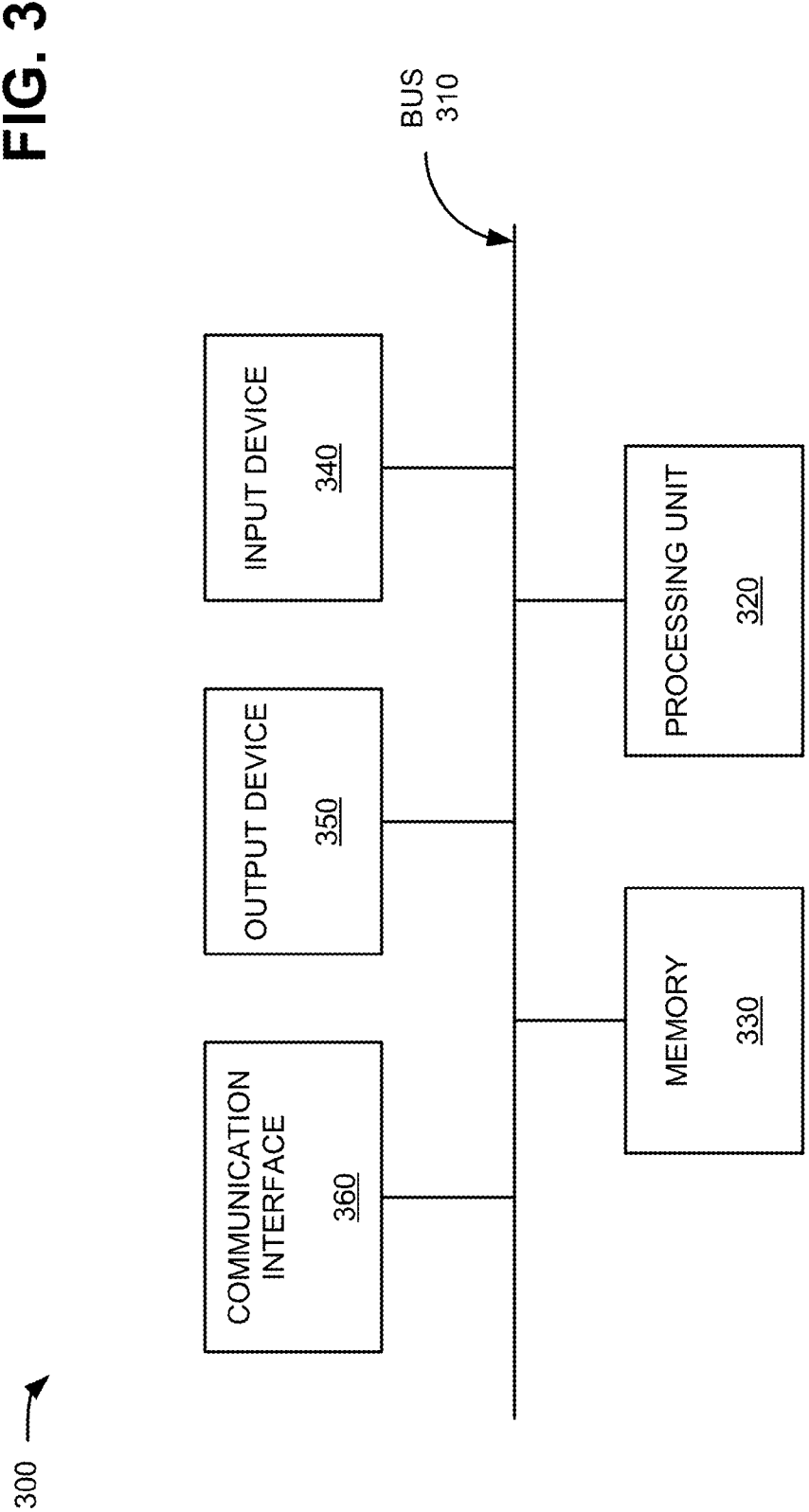
FIG. 3 is a block diagram of exemplary components of a device that may correspond to one of the devices of FIG. 2.

FIG. 3 is a diagram of exemplary components of a device 300. Each of data center 220, content distribution system 230, customer support system 240, partner content provider 250, web content providers 255, and user device 260 may be implemented/installed as software, or a combination of hardware and software, on one or more of device 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
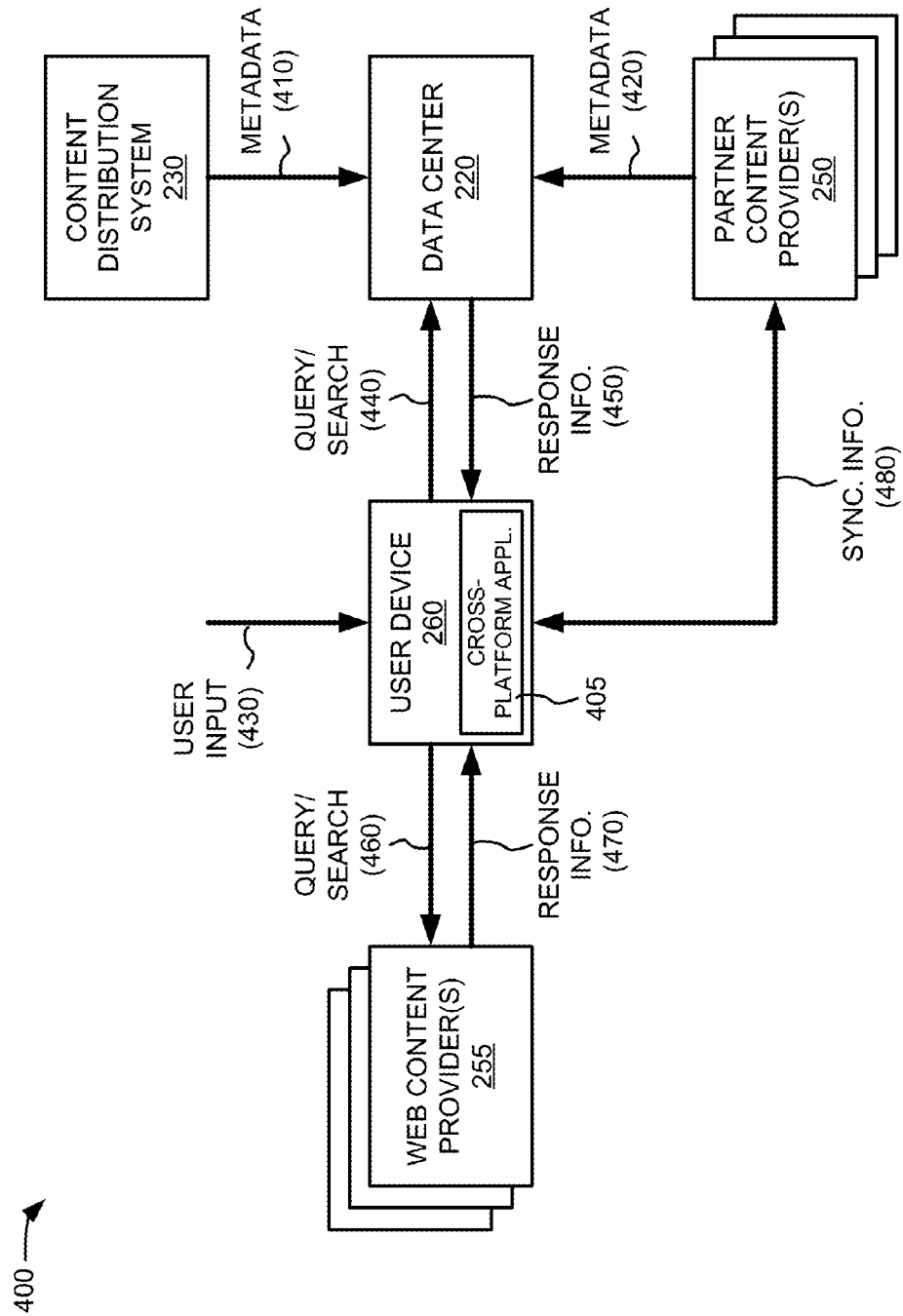
FIG. 4 is a diagram of exemplary communications between devices in the network of FIG. 2.

FIG. 4 is a diagram of exemplary communications for a portion 400 of network 200. Communications in FIG. 4 may represent communications to support managing and cross-referencing content from multiple providers in a cross-platform application. As shown in FIG. 4, network portion 400 may include data center 220, content distribution system 230, partner content providers 250, web content providers 255, and user device 260 including a cross-platform application 405. Data center 220, content distribution system 230, partner content providers 250, web content providers 255, and user device 260 may include features described above in connection with, for example, FIGS. 1-3.

As described further herein, cross-platform application 405 may enable a user of user device 260 to find content of interest, cross reference content, order content, and/or play downloaded or streaming content from any of multiple content providers, such as content distribution system 230, partner content providers 250, and/or web content providers 255.

As shown in FIG. 4, content distribution system 230 may provide metadata 410 to data center 220. Metadata 410 may include, for example, content identifiers (e.g., a universal ID number, hash, etc.), titles, descriptions, images, talent, genres, times, durations, access information, etc. associated with particular content available through content distribution system 230. Similarly, each partner content provider 250 may provide metadata 420 to data center 220. Metadata 420 may include information associated with particular content available through partner content providers 250. Data center 220 may compile metadata 410 and metadata 420 for distribution to user devices 260/cross-platform application 405.

User device 260 may execute cross-platform application 405 and receive user input 430 from a user. For example, user device 260 may receive a user selection/comment via a user interface presented by cross-platform application 405. User input 430 may include, for example, a designation of interest (e.g., a "like" or favorite indication, a queue entry, a bookmark or another indication associated with particular content (e.g., movies, shows, etc.), particular talent (e.g., actor, actresses, directors, studios, etc.), or particular types of content (e.g., genres, sub-genres, etc.)). User input 430 may also include search queries, browse commands, and/or navigation commands related with cross-platform application 405.

In response to user input 430, user device 260 may provide a query/search command 440 to data center 220. Query/search commands 440 may include, for example, a request for information to support a response to user input 430. Query/search command 440 may trigger data center 220 to provide response information 450 to user device 260. For example, if user input 430 is an action to open a link (e.g., hyperlink, a URL, icon or another element that enables a program to access particular data) to information about a particular actress, query/search command 440 may include a request for metadata related to the particular actress. Data center 220 may provide response information 450, which may be received by user device 260. Response information 450 may include, for example, a subset of the compiled metadata from metadata 410 and metadata 420. Thus, for a particular query/search command 440, data center 220 may provide responsive metadata from multiple platforms.

In some implementations, also in response to user input 430, user device 260 may provide a query/search command 460 to one or more web content providers 255. Query/search command 460 may include, for example, a request for supplemental information to support a response to user input 430. For example, if user input 430 is the same action to open a link to information about a particular actress, query/search command 460 may include a request for web content associated with the particular actress. Query/search command 460 may be directed, for example, to a particular web content provider (e.g., a Facebook server, a Twitter server, etc.) or another server that compiles data from multiple web content providers. Web content providers 255 may provide response information 470 to user device 260. Response information 470 may include, for example, metadata related to available web content (e.g., associated with query/search command 460).

As described further herein, user device 260/cross-platform application 405 may receive response information 450 and response information 470 and may combine response information 450 and response information 470 into an interactive compilation for a user of user device 260.

In response to user input 430, in some instances, user device 260 may provide synchronization information 480 to partner content providers 250 and/or receive synchronization information 480 from partner content providers 250. In other implementations, user device 260 and partner content providers 250 may exchange synchronization information 480 independent of user input 430 (e.g., as part of a periodic data exchange). For example, user device 260 may implement application program interfaces (APIs) with individual partner content providers 250 to automatically synchronize queue information between a global queue of all content marked by a user and queues of each individual partner content provider 250. Thus, queue selections made by the user via external communications with partner content providers 250 (e.g., communications not using cross-platform application 405) may be fed to user device 260/cross-platform application 405. Similarly, queue selections made by the user via cross-platform application 405 may be provided to partner content providers 250 for inclusion in individual queues of partner content providers 250. Thus, user device 260 may communicate with data center 220 (e.g., via query/search commands 440) and/or partner content providers 250 (e.g., via synchronization information 480) to collect and compile queue information from multiple providers (e.g., from service provider network 210 and partner content providers 250).

Although FIG. 4 shows exemplary interactions among components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

Figure 5:
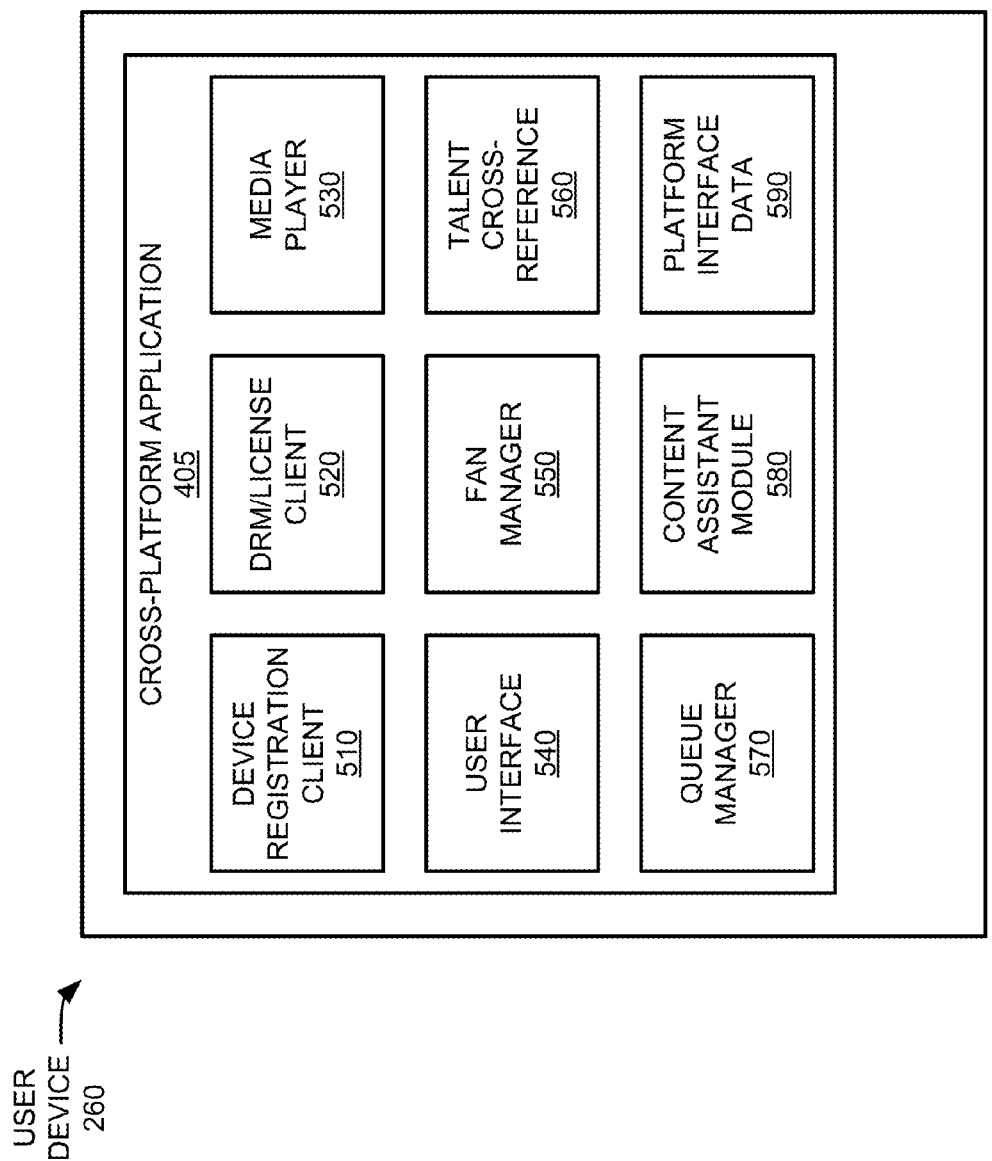
FIG. 5 is a block diagram of exemplary functional components of the user device of FIG. 2.

FIG. 5 is a block diagram of exemplary functional components of user device 260. The functions described in connection with FIG. 5 may be performed by one or more components of FIG. 3. As shown in FIG. 5, user device 260 may include a cross-platform application 405 including a device registration client 510, a DRM/license client 520, a media player 530, a user interface 540, a fan manager 550, a talent cross-reference module 560, a queue manager 570, a content assistant module 580, and platform interface data 590.

Cross-platform application 405 may include components downloaded, for example, from application server 224 in data center 220 when user device 260 contacts application server 224 to enable user device 260 to play content from/via service provider network 210. Cross-platform application 405 may coordinate with service provider network 210 and partner content providers 250 to provide a single interface for viewing content from multiple providers. In addition, cross-platform application 405 may enable user device 260 to perform functions that are described above, such as: playing video content; communicating with and/or presenting information received from data center 220 to a user; permitting a user of user device 260 to login to an account with service provider network 210 (e.g., via application server 224); permitting a user of user device 260 to login to an account with partner content providers 250 and/or web content providers 255; accessing catalog information (e.g., from metadata server 222); submitting an order; and/or consuming live streaming video content (e.g., from content distribution system 230 or partner content providers 250).

Depending on the implementation, cross-platform application 405 may include additional, fewer, different, or differently arranged components than those illustrated in FIG. 5. For example, in one implementation, cross-platform application 405 may not include media player 530. In such implementations, media player 530 may be or may have been installed on user device 260 as a separate application. For example, media player 530 may be a stand-alone application or installed as part of another application (such as an application associated with one or more of partner content providers 250) to present content to a user.

Device registration client 510 may participate in registration of user device 260. For example, device registration client 510 may initiate a registration with one or more of content distribution system 230 and partner content provider 250. For example, to start a registration with content distribution system 230, device registration client 510 may send a message to service provider network 210 to determine whether user device 260 is registered (e.g., recognized by service provider network 210 as a device that can receive content from service provider network 210). The message may include an identifier, also known as a client ID, which is associated and distributed with cross-platform application 405. Upon receipt of the message, service provider network 210 may indicate to device registration client 510 whether user device 260 has been registered at service provider network 210. If user device 260 has not been registered at service provider network 210, service provider network 210 may send an activation code and an activation URL to device registration client 510. In response, the user of user device 260 may manually register user device 260 with service provider network 210 for use of content distribution system 230.

The registration process may include the user using a web browser at user device 260, visiting the activation URL provided by service provider network 210, authenticating the user/user device 260 at the activation URL, and upon successful authentication, inputting the activation code provided by service provider network 210. Upon successful registration, application server 224 may return a globally unique registration token to user device 260 when it contacts application server 224. User device 260 may store the registration token, the activation code, and/or the client ID as platform interface data 590.

Using APIs for partner content providers 250, device registration client 510 may perform similar registration procedures with particular partner content providers 250 (e.g., selected by a user of user device 260). Partner content providers 250 may provide the APIs for inclusion in cross-platform application 405. Data center 220 (e.g., application server 224) may provide a different API to user device 260 depending, for example, on the type of operating system included on user device 260. For example, an application server API may include a web (e.g., web 2.0) API, an Android® API, an iOS API, or a Windows CE API. User device 260 may also store the registration information for partner content providers 250 as platform interface data 590. In one implementation, the registration process may also provide configuration information for user device 260, such as display size, resolution, audio capabilities, etc.

DRM/license client 520 acquires licenses for content that is selected by a user for viewing or playing at user device 260. When a user selects particular content via user interface 540, cross-platform application 405 begins to download either metadata or the content from content distribution system 230 or partner content provider 250. Furthermore, DRM/license client 520 may send a request for a license to content distribution system 230 or partner content providers 250. The request may include all or a portion of platform interface data 590 (e.g., a registration token). If DRM/license client 520 receives a license for the selected content from content distribution system 230/partner content providers 250, DRM/license client 520 stores the license. The license may include a decryption key, for example, to decrypt the particular content. The particular content may be encrypted, for example, for copyright protection.

Media player 530 may decode and play content that is received via content distribution system 230, partner content providers 250, and/or web content providers 255. Media player 530 may output the decoded video to output components (e.g., output device 350) of user device 260.

User interface 540 may enable a user to browse available content, cross-reference content, manage presentation of content options, and select from available content. User interface 540 may also include an account login interface. For example, user interface 540 may request, from data center 220, a list of content available for downloading (e.g., from any of content distribution system 230 and partner content providers 250 for which the user of device 260 has registered) and may present the list of content to a user of user device 260. User interface 540 may include an interactive client interface that allows a user to provide input, such as user passwords, preferences, and selections from the list of available content. In one implementation, user interface 540 may indicate a user's selection to data center 220 and, in return, receive session-specific information to obtain the selected content. In implementations described herein, user interface 540 may also include various interfaces (e.g., associated with functional blocks described below) to cross-reference content options and manage content selection.

Fan manager 550 allows users to mark items to follow, receive push notifications about and track activity through the user interface 540. Users can choose to become a fan of or 'track' separate types of content: series, talent or general. As a fan of a series, a user can mark his/her favorite television or movie series to track activity. Fan manager 550 will generate (e.g., based on metadata from data center 220) notifications for television season premiere dates, television season finale dates, television series cancellations, movie premiere dates, cast member news (such as new members or current members leaving the television or movie series), etc. Notifications may be provided, for example, via user interface 100 (e.g., notification section 130). As a fan of a particular talent, a user can mark his/her favorite people (e.g., actors, actresses, directors, etc.). Fan manager 550 may track activity in television, movies, or the web related to the selected people/entities using, for example, query/search commands 440/460 and response information 450/470. As a fan of general categories, a user can mark items of interest like specific genres, other content categories, a production entity, or a particular television/movie studio. Fan manager 550 may provide, for example, notifications of new titles of the particular genre or by the particular studio that have been added to content catalogs (e.g., compiled by data center 200).

In one implementation, fan manager 550 may also integrate with bookmark and notification features. For example, in response to a bookmark selection, fan manager 550 may provide a message within the bookmarking process so that, after the user bookmarks an item of content, fan manager 550 can solicit if the user also wants to be a fan of a series associated with the content item.

In another implementation, fan manager 550 may also integrate with digital video recorder (DVR) and electronic program guide (EPG) data to permit a user to easily access and/or record a selected television or movies series. DVR and EPG data may be included, for example, in data center 220. Through user account settings (e.g., associated with service provider network 210), fan manager 550 may provide DVR instructions from user interface 540. Recording instructions may be provided for both first run and repeat viewings of selected programs.

Fan manager 550 may integrate with social networking sites (e.g., web content providers 255) to receive notifications from the social network accounts associated with a particular marked content type. For example, fan manager 550 may (e.g., via query/search commands 460 and response information 470) cause cross-platform application 405 to collect information for a particular series, talent, or general content from an official Facebook, Twitter, Google+, and/or WhoSay? account associated with a marked item.

FIG. 6 provides a sample user interface for a fan page 610 that may be populated with information from fan manager 550. As shown in FIG. 6, fan page 610 may be directed toward a particular talent (e.g., "Actress 1"). Fan page 610 may include a notification section (e.g., "Actress 1 notifications") with notifications related only to the particular talent. Fan page 610 may also include metadata from multiple sources (e.g., as compiled by data center 220 and/or retrieved directly from web content provider 255) relating to the particular talent.

FIG. 6 and other depictions herein include exemplary user interfaces which may be suitable for a particular type of user device 260, such as a tablet computer. However, in other implementations, user interfaces may include different information and/or arrangements that may be more suitable for different user devices. For example, in other implementations, a user interface may be provided for a smartphone, personal computer, internet television, or another type of user device 260.

Figure 7A:
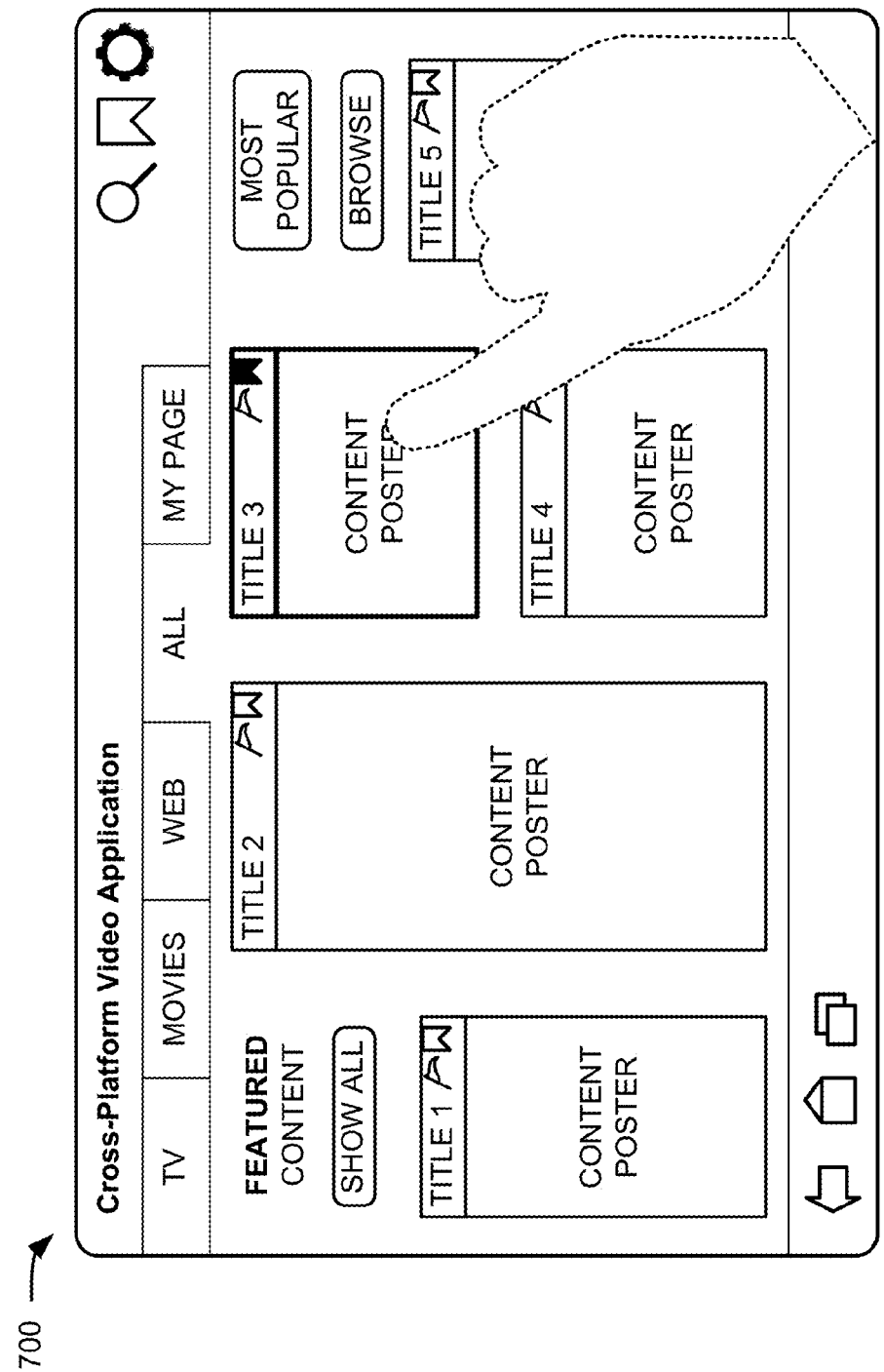
Figure 7D:
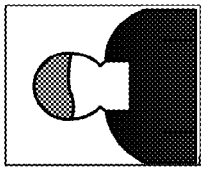

Referring to FIG. 5, talent cross-reference module 560 works within a talent detail page to incorporate information from program-related appearances, social networks, web videos, etc. to populate the talent detail page to provide a richer experience for the user. Talent cross-reference module 560 uses metadata of a particular talent (e.g., from data center 220) that is further enhanced by cross-references to other activity of that particular talent across the television and online platform (e.g., from web content providers 255). FIGS. 7A-7E illustrate exemplary user interfaces that implement information from talent cross-reference module 560. As shown in FIG. 7A, cross-platform application 405 may present a welcome screen 700 that allows a user to select from a variety of featured content which may be associated with one or more partner content providers 250. Selection of a particular content item (e.g., "Title 3") by a user, may cause cross-platform application 405 to present an information screen 710 for the selected content item, as shown in FIG. 7B. In the example of FIG. 7B, the selected content item may include a television series with multiple seasons and/or episodes. A user may navigate through different episode listings to read about each episode and/or select an episode to view via one of multiple available providers. Assume a user selects an option (e.g., "more") to provide more details about a particular episode (e.g., Episode 3). The user's selection may cause cross-platform application 405 to present an information screen 720 for the selected episode, as shown in FIG. 7C. The information screen may provide listings/links to talent (e.g., cast and crew) associated with the selected episode. Assume a user selects an option (e.g., "Actress 1") to provide more details about a particular cast member. The user's selection may cause cross-platform application 405 to present a talent detail screen 730 for the selected person, as shown in FIG. 7D. On this page, talent cross-reference module 560 can fill a "Latest Activity" section with information relating to the activities/appearances of "Actress 1" which may be collected from data center 220, partner content providers 250, and/or web content providers 255. For example, the "Latest Activity" section may include Actress 1's appearance on a talk show (e.g., "Show Title 8" tonight on CN at 8:00 PM), a rebroadcast of a another program including Actress 1 (e.g., "Show 2" Monday on FX at 9:30 PM), the latest "Actress 1" video diary on her YouTube channel, and Actress 1's latest tweets. In one implementation, metadata of each content provider may include, for example, tags for keywords, talent, sources, etc., along with time stamps to allow data center to associate metadata with user selections.

Figure 7E:
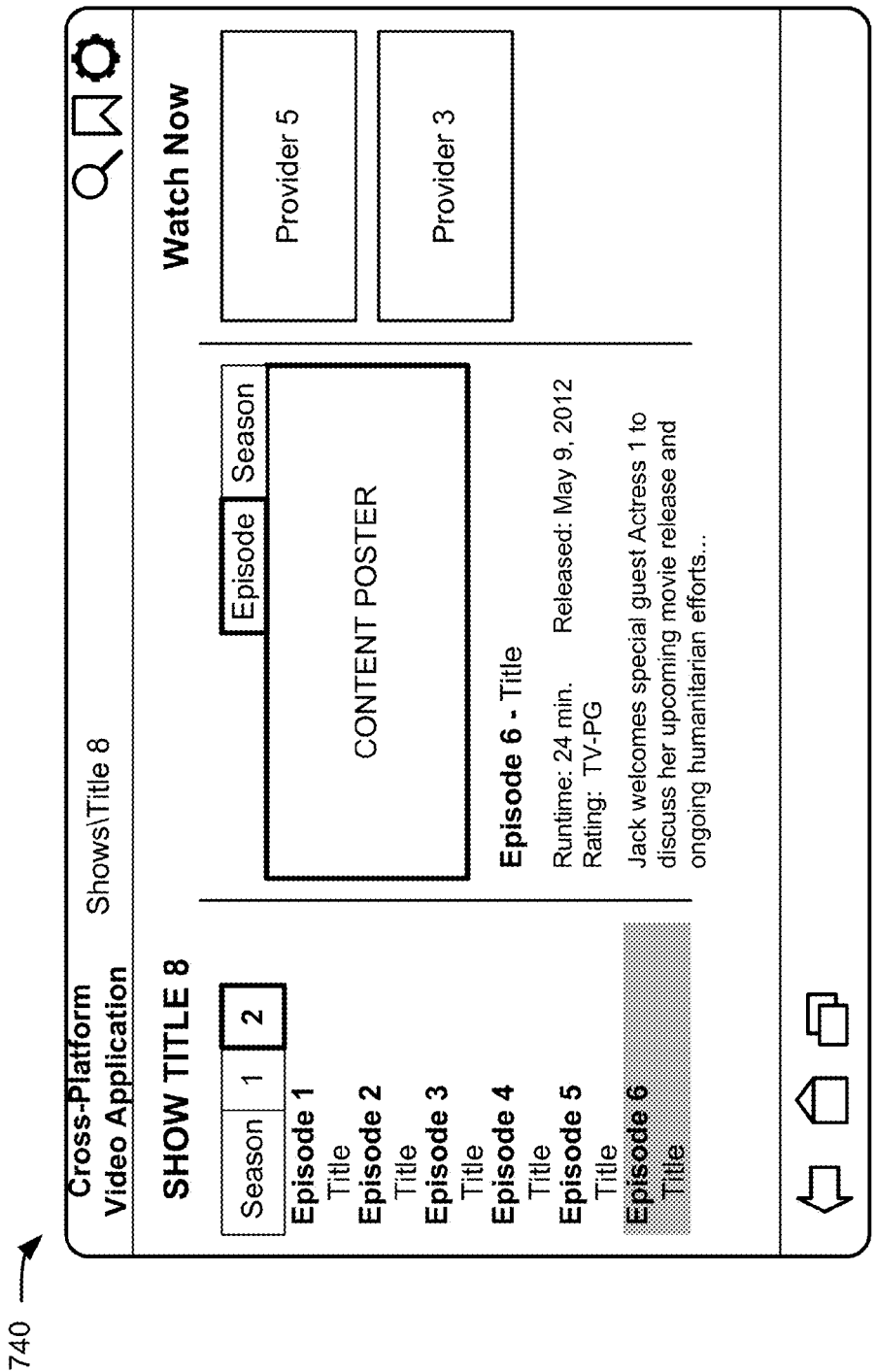

A user's selection of a particular link in FIG. 7D (e.g., "Show Title 8" tonight on CN at 8:00 PM), may cause cross-platform application 405 to present an information screen 740 for the selected content item, as shown in FIG. 7E. Information screen 740 may include, for example, a similar presentation/format to that of information screen 710 (e.g., with metadata related to "Show Title 8").

A users selection of a particular link in FIG. 7D (e.g., "Show Title 8" tonight on CN at 8:00 PM), may cause cross-platform application 405 to present an information screen 740 for the selected content item, as shown in FIG. 7E. Information screen 740 may include, for example, a similar presentation/format to that of information screen 710 (e.g., with metadata related to "Show Title 8).

Referring again to FIG. 5, queue manager 570 provides a global queue across multiple content providers. Generally, queues may include a list of current and prospective content (e.g., television shows, movies, etc.) of interest to a particular user. Content may be added to a queue, for example, when a user makes a particular selection or selects a series of programs. In implementations described herein, queue manager 570 may communicate with data center 220 (e.g., via query/search commands 440) and/or partner content providers 250 (e.g., via synchronization information 480) to collect and compile queue information from multiple providers (e.g., service provider network 210 and partner content providers 250). Queue manager 570 may prioritize content items from the multiple queues within a single queue.

Queue manager 570 may allow users to add items to the global queue across all content providers, for example, by selecting an "add" or a "bookmark" feature associated with particular content. For example, referring to FIG. 7A, a bookmark option may be included with each thumbnail or content description in a content list, regardless of the particular provider. FIG. 8 provides an exemplary user interface that implements queue manager 570. As shown in FIG. 8, a global queue section 810 may provide an integrated listing of queued items from different providers (e.g., partner content providers 250 with whom the user has an account). Queue manager 570 may provide a variety of queue management options, such as those indicated in options menu 820.

As shown in FIG. 8, options may include, for example, move, remove, sync with local queues, move to top, and set provider priority. The "move" option permits a user to adjust the ordinal rank of an item in the global queue. The "remove" option permits a user to delete an item from the global queue. The "move to top" option permits a user to move a particular content item to the head of the global queue. The sync with local queues option causes queue manager 570 to include changes from a dedicated provider queue (e.g., associated with a single partner content provider 250) in the global queue and/or to include changes from the global queue into a dedicated provider queue. Queue manager 570 may, for example, implement APIs with individual partner content providers 250 to automatically synchronize queue information between the global queue of cross-platform application 405 and each partner content provider 250 queue. The "set provider priority" option may permit a user to set preferences for one content provider (e.g., content distribution system 230 or partner content provider 250) over another content provider. For example, a user may prefer an account with unlimited content over an account with a pay-per-use format.

Figure 9:
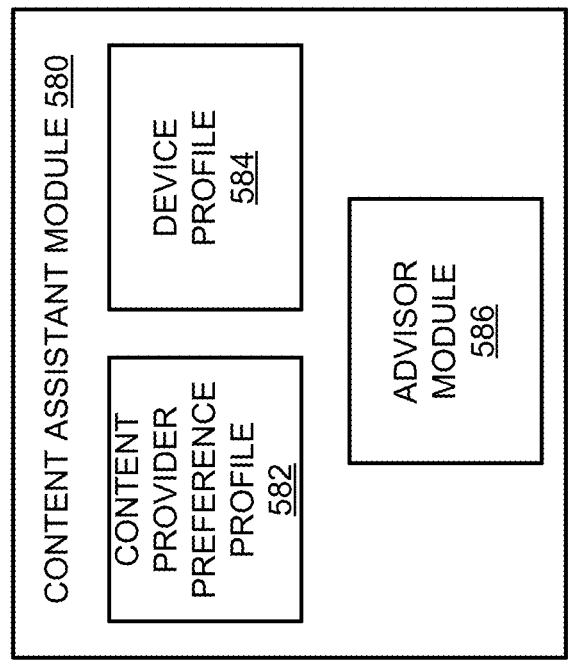
FIG. 9 is a diagram of exemplary functional components of the content assistant module of FIG. 5.

Content assistant module 580 helps the user find, record, and watch content they like when and how they want, and manage the appropriate content provider accounts and devices to do so. Content assistant module 580 may coordinate with the other functional components of cross-platform application 405, such as fan manager 550 and queue manager 570, as well as various backend preference data and profiles. FIG. 9 provides a block diagram of exemplary functional components of content assistant module 580. Content assistant module 580 may include a content provider preference profile 582, a device profile 584, and an advisor module 586.

Content provider preference profile 582 may detect and/or collect user input to identify which content providers a user has access to and prefers. Content provider preference profile 582 may include information indicating, for example, a user's television service provider (e.g., content distribution system 230), subscription packages with the television service provider (e.g., on-demand packages, etc.), online/DVD providers the user has subscribed to (e.g., partner content providers 250), content providers the user prefers to purchase content from, free providers, etc. Content provider preference profile 582 may also include information on relative preferences between these content sources, with the subscription services getting default high priorities.

Additionally, content assistant module 580 may generate and/or manage device profile 584. Device profile 584 indicates the various devices the user has (since not all content from all sources is viewable on and/or optimized for all devices). Device profile 584 may also include information about any recording device (e.g., a DVR, TiVo, etc.) available to users of user device 260 and its respective recording capacity.

Advisor module 586 may use information from content provider preference profile 582 and device profile 584 to assist in providing recommended content to users. More particularly, advisor module 586 identifies content of interest to the user and determines the best way to make the identified content available for the user to watch based on factors such as user device type, preferred content providers, user cost, preferred times, etc. Content of interest to the user may include content that the user has expressed interest in explicitly (e.g., by bookmarking a television series or becoming a "fan" of a particular actor) or that another system determines may be of interest to the user based on a content preference profile (e.g., a recommendation engine in data center 220). In one implementation, advisor module 586 may provide recommendations in the form of a notification (e.g., via notifications section 130). In another implementation, recommendations from advisor module 586 may be integrated within other search results.

The following use cases exemplify some features of content assistant module 580. Assume a particular content (e.g., an episode of a series that the user is a "fan" of) becomes available from one of partner content providers 250 (e.g., to which the user has previously subscribed). Content assistant module 580 may communicate with queue manager 570 to add the particular content to the user's global queue. Queue manager 570 will, accordingly, add the content to the user's account with partner content provider 250. Priority within the global queue may be influenced by data in content provider preference profile 582 and/or device profile 584. For example, based on the profiles, content assistant module 580 may give higher priority to a content provider with an instant streaming queue versus a DVD queue.

As another use case, assume a particular movie is available from a television provider's (e.g., content distribution system 230) VOD offerings and from other partner content providers 250 for a fee. Based on content provider preference profile 582, device profile 584, and the cost of the show, content assistant module 580 can make a recommendation to the user regarding from which provider to purchase the movie. In one implementation, the user could also provide a default rule (e.g., within content provider preference profile 582) that allows cross-platform application 405 to process the purchase from a specific provider (e.g., one of content distribution system 230 or partner content providers 250) as long as the cost is within a user-specified threshold. For example, cross-platform application 405 may be integrated with an ordering system from the particular partner content provider 250.

In an additional use case, assume a particular movie in the global queue becomes available from a better option than the one currently scheduled. Content assistant module 580 can make appropriate adjustments to the user's global queue and synchronize with individual queues. For example, a show in the user's Netflix queue is determined to be airing on live television. Content assistant module 580 may set up a DVR recording of the live television presentation and remove the item from the Netflix queue, if the user does not utilize the Netflix queue before the time of the live television presentation.

Returning again to FIG. 5, platform interface data 590 may include, for example, APIs, URLs, login information (e.g., a user identifier and a password), and other information to enable cross-platform application 405 to access content from content distribution system 230, partner content providers 250, and/or web content providers 255. In one implementation, platform interface data 590 may also include session-specific information, such as, for example, cookies, URLs, or other information to enable user device 260 to access content servers or digital rights management (DRM) servers associated with content distribution system 230, partner content providers 250, and/or web content providers 255.

Although FIG. 5 shows exemplary functional components of user device 260, in other implementations, user device 260 may include fewer, different, and/or additional functional components than depicted in FIG. 5. For example, platform interface data 590 is shown as a part of cross-platform application 405, in another implementation, platform interface data 590 may be a separate component outside of cross-platform application 405. Alternatively, or additionally, one or more functional components of user device 260 may perform one or more other tasks described as being performed by one or more other functional components of user device 260.

FIG. 10 is a flow diagram of an exemplary process 1000 for providing content management in a cross-platform application. In one implementation, process 1000 may be performed by user device 260. In another implementation, some or all of process 1000 may be performed by another device or group of devices, including or excluding user device 260. For example, a device in service provider network 210 may perform one or more parts of process 1000.

As shown in FIG. 10, process 1000 may include presenting an interface providing access to content from multiple content providers having separate subscriptions (block 1010). For example, as described above in connection with FIG. 7A, cross-platform application 405 on user device 260 may present a welcome screen 700 that allows a user to select from a variety of featured content which may be associated with multiple content providers.

Process 1000 may further include receiving an indication of user interest for an aspect of particular content (block 1020), and providing an indication of the user interest to a data center (block 1030). For example, as described above in connection with FIGS. 4 and 7C, user device 260 may receive a user selection/comment via a user interface presented by cross-platform application 405. User input 430 may include, for example, a designation of interest (e.g., a "like" or favorite indication, a queue entry, a bookmark or another indication associated with particular content (e.g., movies, shows, etc.), particular talent (e.g., actor, actresses, directors, studios, etc.), or particular types of content (e.g., genres, sub-genres, etc.)). In the example of FIG. 7C, user input 430 may be selection of a particular talent. In response to user input 430, user device 260 may provide a query/search command 440 to data center 220. Search/query commands 440 may include, for example, a request for information to support a response to user input 430.

Process 1000 may also include receiving, from the data center, links to additional content that is related to the aspect of the particular content (block 1040). For example, as described above in connection with FIGS. 4 and 7C, query/search command 440 may trigger data center 220 to provide response information 450 to user device 260. For example, if user input 430 is an action to open a link to information about a particular actress (e.g., "Actress 1" in FIG. 7C), query/search command 440 may include a request for metadata related to the particular actress. Data center 220 may provide response information 450, which may be received by user device 260. Response information 450 may include, for example, a subset of the compiled metadata from metadata 410 and metadata 420.

Process 1000 may also include retrieving metadata of supplemental content, related to the aspect of the particular content, from web content providers (block 1050), and presenting the links to the additional content and the supplemental content metadata in association with the aspect of the particular content (block 1060). For example, as described above in connection with FIGS. 4 and 7D, user device 260 may provide a query/search command 460 to one or more web content providers 255. Query/search command 460 may include, for example, a request for supplemental information to support a response to user input 430. For example, if user input 430 is the same action to open a link to information about a particular actress (e.g., "Actress 1 of FIG. 7C), query/search command 460 may include a request for web content associated with the particular actress. Query/search command 460 may be directed, for example, to a particular web content provider (e.g., a Facebook server, a Twitter server, etc.) or another server or aggregator that compiles data from multiple web content providers. Web content providers 255 may provide response information 470 to user device 260. User device 260 (e.g., executing cross-platform application 405) may present the additional content links from partner content providers 250 and the supplemental content metadata from web content provider 255. For example, as shown in FIG. 7D, user device 260 may fill a "Latest Activity" section with information relating to the activities/appearances of "Actress 1" which may be collected from data center 220, partner content providers 250, and/or web content providers 255.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 10, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    presenting, by a user device and to a user, a user interface providing access to content from multiple content providers, each of the multiple content providers having a separate account associated with the user;
    receiving, by the user device and via the user interface, a first input indicating interest in a first particular content item available from a first content provider of the multiple content providers;
    receiving, by the user device and via the user interface, a second input indicating interest in a second particular content item available from a second content provider, different than the first content provider, of the multiple content providers;
    presenting, by the user device and in a single queue via the user interface, indications of the first particular content item as available from the first content provider and the second particular content item as available from the second content provider integrated into a first ranked listing, of the user's queued content items from accounts associated with the multiple content providers, according to a priority determined by a user-specified relative preference between the first content provider and the second content provider;

identifying, by the user device and subsequent to the presenting, a scheduled availability of the second particular content item from a third content provider of the multiple content providers;

determining, by the user device, that the second particular content item has not been delivered to the user from the second content provider before the scheduled availability from the third content provider;

setting up, by the user device and based on the determining, a recording of the second particular content item based on the scheduled availability from the third content provider;

adjusting, by the user device, the first ranked listing by removing the indication of the second particular content item as available from the second content provider to form a second ranked listing responsive to a determination that the third content provider is preferred over the second content provider by the user with respect to the second particular content item; and presenting, by the user device and in the single queue via the user interface, the second ranked listing including indications of the first particular content item as available from the first content provider and the second particular content item as available from the third content provider.

2. The method of claim 1, further comprising:
providing, to the first content provider, a signal of the first input; and
providing, to the second content provider, a signal of the second input.

3. The method of claim 2, wherein the signal of the first input includes a synchronization record for a queue associated with the first content provider.

4. The method of claim 1, further comprising:
receiving a synchronization record for a queue associated with the first content provider; and
updating the single queue to reflect the synchronization record.

5. The method of claim 1, further comprising:
removing the second particular content item from a queue associated with the second content provider.

6. The method of claim 1, wherein the multiple content providers are selected from a group of subscription-based over-the-top (OTT) media providers.

7. The method of claim 1, wherein the determination that the third content provider is preferred over the second content provider is based on a cost to the user and a time of delivery associated with the second particular content item.

8. A non-transitory computer-readable medium comprising computer-executable instructions, the computer-readable medium comprising one or more instructions to:
present, by a user device and to a user, a user interface providing access to content from multiple content providers, each of the multiple content providers having a separate account associated with the user;
receive, by the user device and via the user interface, a first input indicating interest in a first particular content item available from a first content provider of the multiple content providers;
receive, by the user device and via the user interface, a second input indicating interest in a second particular content item available from a second content provider, different than the first content provider, of the multiple content providers;

present, by the user device and in a single queue via the user interface, indications of the first particular content item as available from the first content provider and the second particular content item as available from the second content provider integrated into a first ranked listing, of the user's queued content items from accounts associated with the multiple content providers, according to a priority determined by a user-specified relative preference between the first content provider and the second content provider;

identify, by the user device and subsequent to the presenting, a scheduled availability of the second particular content item from a third content provider of the multiple content providers;

determine, by the user device, that the second particular content item has not been delivered to the user from the second content provider before the scheduled availability from the third content provider;

set up, by the user device and based on the determining, a recording of the second particular content item based on the scheduled availability from the third content provider;

adjust, by the user device, the first ranked listing by removing the indication of the second particular content item as available from the second content provider to form a second ranked listing responsive to a determination that the third content provider is preferred over the second content provider by the user with respect to the second particular content item; and present, by the user device and in the single queue via the user interface, the second ranked listing including indications of the first particular content item as available from the first content provider and the second particular content item as available from the third content provider.

9. The non-transitory computer-readable medium of claim 8, further comprising one or more instructions to:
provide, to the first content provider, a signal of the first input; and
provide, to the second content provider, a signal of the second input.

10. The non-transitory computer-readable medium of claim 9, wherein the signal of the first input includes a synchronization record for a queue associated with the first content provider.

11. The non-transitory computer-readable medium of claim 8, further comprising one or more instructions to:
receive a synchronization record for a queue associated with the first content provider; and
update the single queue to reflect the synchronization record.

12. The non-transitory computer-readable medium of claim 8, further comprising one or more instructions to:
remove the second particular content item from a queue associated with the second content provider.

13. The non-transitory computer-readable medium of claim 8, wherein the multiple content providers are selected from a group of subscription-based over-the-top (OTT) media providers.

14. A user device, comprising:
one or more memories to store instructions; and
one or more processors configured to execute instructions in the one or more memories to:
present, to a user, a user interface providing access to content from multiple content providers, each of the multiple content providers having a separate account associated with the user;

receive, via the user interface, a first input indicating interest in a first particular content item available from a first content provider of the multiple content providers;

receive, via the user interface, a second input indicating interest in a second particular content item available from a second content provider, different than the first content provider, of the multiple content providers;

present, in a single queue via the user interface, indications of the first particular content item as available from the first content provider and the second particular content item as available from the second content provider integrated into a first ranked listing, of the user's queued content items from accounts associated with the multiple content providers, according to a priority determined by a user-specified relative preference between the first content provider and the second content provider;

identify, subsequent to the presenting, a scheduled availability of the second particular content item from a third content provider of the multiple content providers;

determine that the second particular content item has not been delivered to the user from the second content provider before the scheduled availability from the third content provider;

set up, based on the determining, a recording of the second particular content item based on the scheduled availability from the third content provider;

adjust, by the user device, the first ranked listing by removing the indication of the second particular content item as available from the second content provider to form a second ranked listing responsive to a determination that the third content provider is preferred over the second content provider by the user with respect to the second particular content item; and present, in the single queue via the user interface, the second ranked listing including indications of the first particular content item as available from the first content provider and the second particular content item as available from the third content provider.

15. The user device of claim 14, wherein the one or more processors are configured to further execute instructions to:
provide, to the first content provider, a signal of the first input; and
provide, to the second content provider, a signal of the second input.

16. The user device of claim 15, wherein the signal of the first input includes a synchronization record for a queue associated with the first content provider.

17. The user device of claim 14, wherein the one or more processors are configured to further execute instructions to:
receive a synchronization record for a queue associated with the first content provider; and
update the single queue to reflect the synchronization record.

18. The user device of claim 14, wherein the one or more processors are configured to further execute instructions to:
remove the second particular content item from a queue associated with the second content provider.

19. The user device of claim 14, wherein the multiple content providers are selected from a group of subscription-based over-the-top (OTT) media providers.

20. The user device of claim 14, wherein the determination that the third content provider is preferred over the second content provider is based on a cost to the user and a time of delivery associated with the second particular content item.

* * * * *